US008851823B1

(12) United States Patent
Hallmon, Jr.

(10) Patent No.: US 8,851,823 B1
(45) Date of Patent: Oct. 7, 2014

(54) RETRIEVAL AND HOIST WINCH ASSEMBLY FOR A VEHICLE

(76) Inventor: James H. Hallmon, Jr., Cordova, AL (US)

( * ) Notice: Subject to any disclaimer, the term of this patent is extended or adjusted under 35 U.S.C. 154(b) by 0 days.

(21) Appl. No.: 13/596,871

(22) Filed: Aug. 28, 2012

Related U.S. Application Data

(60) Provisional application No. 61/530,664, filed on Sep. 2, 2011.

(51) Int. Cl.
*B60P 1/00* (2006.01)

(52) U.S. Cl.
USPC .......................................... 414/540; 414/546

(58) Field of Classification Search
CPC ................................ A61G 3/062; A61G 3/00
USPC ........................................................ 414/540
See application file for complete search history.

(56) References Cited

U.S. PATENT DOCUMENTS 3,677,424 A * 7/1972 Anderson .................... 414/550
5,119,961 A 6/1992 Runn
5,205,700 A * 4/1993 Lin et al. ...................... 414/540
5,509,639 A 4/1996 Ellis
5,876,019 A 3/1999 Morrissey, Jr. et al.
5,971,177 A * 10/1999 Carter .......................... 212/177
6,138,991 A 10/2000 Myers, Jr.
7,261,631 B1 8/2007 Golson, Sr.

* cited by examiner

*Primary Examiner* — Saul Rodriguez
*Assistant Examiner* — Willie Berry, Jr.
(74) *Attorney, Agent, or Firm* — Bush Intellectual Property Law; Kenneth M. Bush

(57) ABSTRACT

A hoist assembly having a winch with a motor, a boom that rotates upward and downward, and a boom support cable which prevents the boom from rotating downwards below a desired level. The boom support cable is connected to an adjustment bar which adjusts the length of the boom support cable to fix the boom position at a desired angle. Alternatively, a boom hook can be used to fix the boom position at a desired angle. The winch and boom are attached at a front end of a cargo receiving area of a vehicle and are constructed to retrieve a load to the vehicle, lift the load, and place the load into the cargo receiving area. The winch is constructed to lift both the load and the boom simultaneously.

6 Claims, 5 Drawing Sheets

Fig. 5
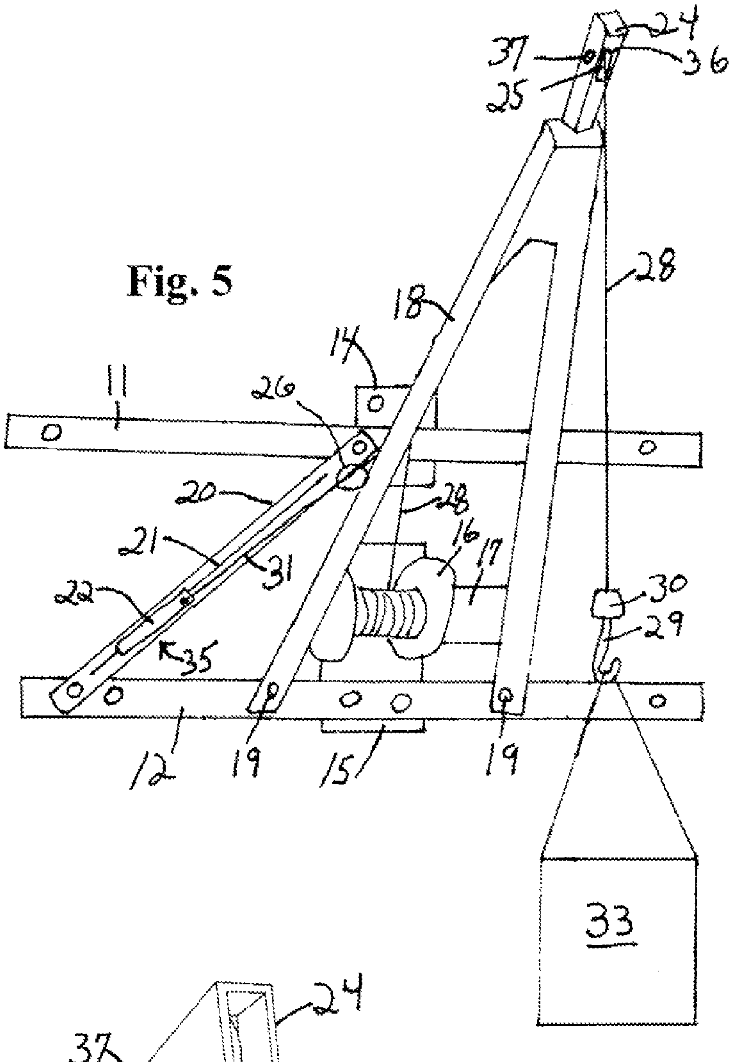
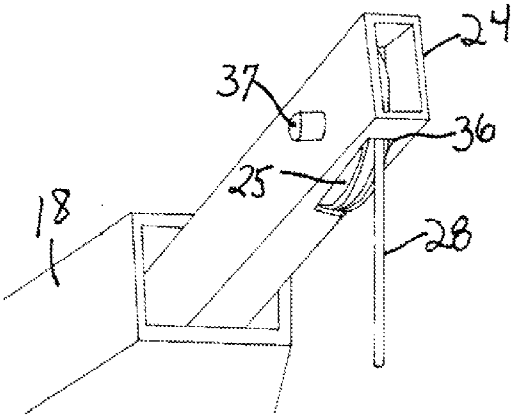
Fig. 6

RETRIEVAL AND HOIST WINCH ASSEMBLY FOR A VEHICLE

CROSS-REFERENCE TO RELATED APPLICATIONS

The present application claims priority to U.S. Provisional Patent Application No. 61/530,664, filed Sep. 2, 2011, the disclosure of which is incorporated herein by reference.

FIELD OF THE INVENTION

This invention relates generally to hoisting systems and, more particularly, to a retrieval and hoist winch system for a vehicle, such as an all-terrain vehicle, wherein the winch system can be used to retrieve an object by pulling the object to the vehicle and then hoisting the object upward and into a cargo receiving area of the vehicle.

BACKGROUND OF THE INVENTION

It is often desirable to lift heavy loads onto a vehicle for transport to another location and then unload the vehicle. Loads may be at remote locations where there are no machines to complete the loading process. For example, hunting areas are at remote locations and there may be no machinery to lift game such as deer, hogs, antelopes and the like onto a vehicle. Frequently, all-terrain vehicles are used for hunting because of their capability to access remote locations. It is necessary in many cases to be able to drag a dead game animal for a certain distance, pull the game animal to the vehicle, hoist the game animal above a loading bed of the vehicle, and then deposit the game animal onto the loading bed for transport. U.S. Pat. No. 5,876,019 describes a winching apparatus for an all-terrain vehicle. U.S. Pat. No. 6,138,991 describes a vehicle-mounted hoist apparatus. These devices will lift a load and deposit the load onto the vehicle. There is no mechanism for dragging the game animal or drawing the game animal to the vehicle. Other limitations of these devices are that the boom height and angle are fixed, the winch is attached to the boom, the winch lifts only the weight and not the boom, and there are no means for driving the winch electrically. In addition, these systems are located at the rear or side of the vehicle and are not compatible with the use of a dumping bed.

SUMMARY OF THE INVENTION

The invention is a hoist assembly having a winch with a motor attached to a support system and a boom attached rotatably at a first end to the support system so that the boom can be rotated upward and downward. A cable sheave is attached to the support system above the winch. One or more cable sheaves are attached near a second opposite end of the boom. A winch cable is attached to the winch and extends from the winch over the cable sheave attached to the support system above the winch and to the one or more cable sheaves near the second end of the boom. A boom support cable is used to prevent the boom from rotating downwards below a desired level. A first end of the boom support cable is connected to the support system above the winch and a second opposite end of the boom support cable is connected to the boom near the second opposite end of the boom. The first end of the boom support cable may be connected to the support system by means of an adjustment bar which adjusts the length of the boom support cable between the adjustment bar and the boom support cable's point of connection near the second opposite end of the boom. The adjustment bar may have a grabbing mechanism for adjusting the length of the boom support cable between the adjustment bar and the boom support cable's point of connection near the second opposite end of the boom. The boom support cable can, thus, be adjusted to hold the boom in a desired fixed elevated position while the winch raises or lowers a load by means of the winch cable.

In an alternate embodiment a boom hook may be used instead of an adjustment bar. A boom hook may be attached rotatably and slidably to the support system wherein the boom hook, when reversibly engaging the boom, holds the boom in a fixed elevated position while the winch raises or lowers a load by means of the winch cable.

The hoist assembly is attached to a vehicle so that the hoist assembly can retrieve a load to the vehicle, lift the load, and place the load into a cargo receiving area of the vehicle.

An advantage of the present invention is a mechanism for dragging a game animal or drawing the game animal to the vehicle.

Another advantage is that the boom height and angle are variable.

Another advantage is that the winch and the boom are positioned near the front end of the cargo receiving area of the vehicle.

Another advantage is that the hoist assembly can lift both the load and the boom simultaneously.

Another advantage is that the winch is driven electrically.

BRIEF DESCRIPTION OF THE DRAWINGS

FIG. 5 illustrates that the weight attached to the cable can be lowered by the winch while the position of the boom remains fixed by the boom support cable.

FIG. 6 shows a detailed view of the boom extension, further showing the cable sheave in the boom extension.

DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

The retrieval and hoist winch assembly of the present invention attaches to the back of a cab or roll bar enclosure of a vehicle near the front end of the loading bed or dumping bed of the vehicle. The boom extends from the back of the cab or roll bar enclosure over the bed of the vehicle, and beyond the back end of the vehicle bed when the boom is in a horizontal position. The apparatus can be used to drag loads, retrieve loads, hoist loads, and place loads in the loading or dumping beds of vehicles.

Figure 1:
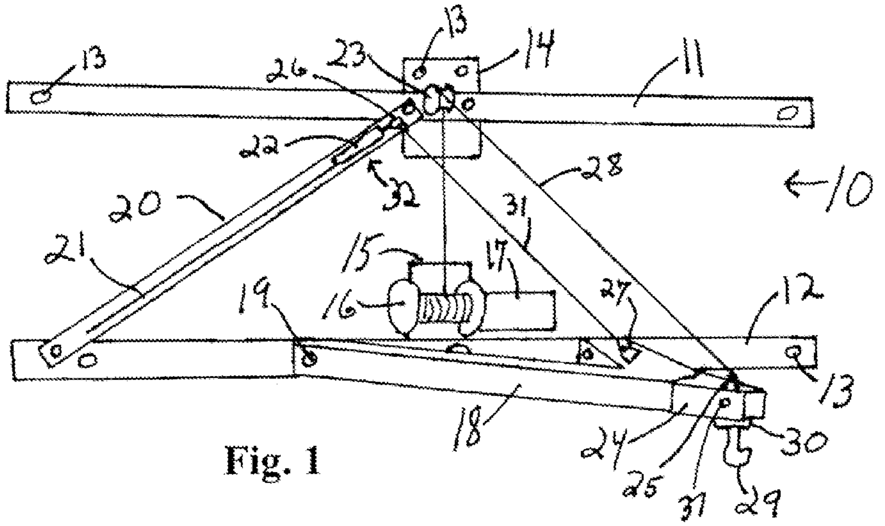
FIG. 1 shows the winch assembly of the present invention with a boom in a horizontal position.

FIG. 1 shows the winch assembly 10 of the present invention with a boom 18 in a horizontal position. The winch assembly 10 has an upper lift bar 11 and a lower lift bar 12. An upper support plate 14 may be used for further attachment of bar 11. A lower support plate 15 may be attached to bar 12 for attachment of winch 16 with its electric motor 17. The components 11, 12, 14, and 15, collectively referred to as a support system, may be attached to the back of a cab or roll bar enclosure of a vehicle (not shown). The bars 11 and 12 can be attached by any suitable means, such as bolts 13. The boom 18 is attached rotatably to bar 12 by any suitable rotating connectors or connector assembly 19. An adjustment bar 20 is attached to one end of bar 12 and extends diagonally to a central area of bar 11. A channel 21 extends along the length of the adjustment bar 20. A grab mechanism 22 is positioned slideably within channel 21 so that it can slide along the length of bar 20 and be reversibly fixed to bar 20 at any desired point along bar 20. An upper lift bar sheave 23 is attached to bar 11 in a central portion of bar 11. Boom 18 may have a boom extension 24 with a boom sheave 25 contained therein. Sheave 25 rotates on axle 37. Adjustment bar 20 has an eye hook 26 and boom 18 has a cable connector 27. Winch 16 has a supply of winch cable 28 wound thereon. The winch cable 28 extends from winch 16 over sheave 23, extending to sheave 25, extending over sheave 25, and through boom extension 24. At the end of winch cable 28 is a lift hook 29 having a base 30. The base 30 prevents lift hook 29 from passing over sheave 25. Lift hook 29 is used for attachment to objects for lifting. A boom support cable 31 extends from its attachment to cable connector 27, through eye hook 26 on adjustment bar 20, to grabbing mechanism 22 to which it is attached.

Figure 2:
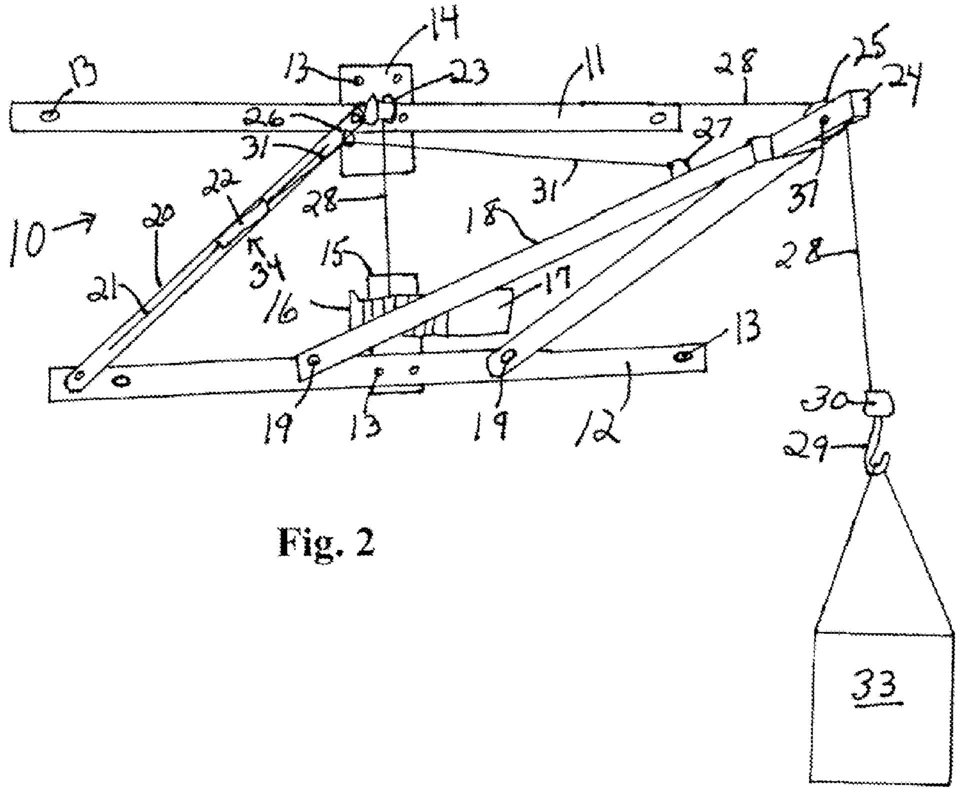
FIG. 2 shows the boom elevated slightly above the horizontal position.

The boom 18 is shown in a horizontal position in FIG. 1. It is held in this position by boom support cable 31. The boom 18 can be lifted upward but cannot be moved downward. It is held in this position by grab mechanism 22 shown in position 1 at 32 on adjustment bar 20. In FIG. 2 the boom is shown elevated slightly above the horizontal position. This is accomplished by moving the grabbing mechanism 22 down the adjustment bar 20 to position 2 shown at 34. The grabbing mechanism 22 is then locked to the adjustment bar 20 in this position. The winch cable 28 is shown extended down from the boom extension 24. This is accomplished by turning on the winch motor 17 to unwind the winch cable 28 as desired. The boom 18 does not move as the winch cable 28 is unwound because the boom 18 is held in place by the boom support cable 31. Lift hook 29 is connected to a weight 33. In the position shown in FIG. 3 weight 33 is elevated sufficiently to clear the top of the bed of the vehicle.

Figure 3:
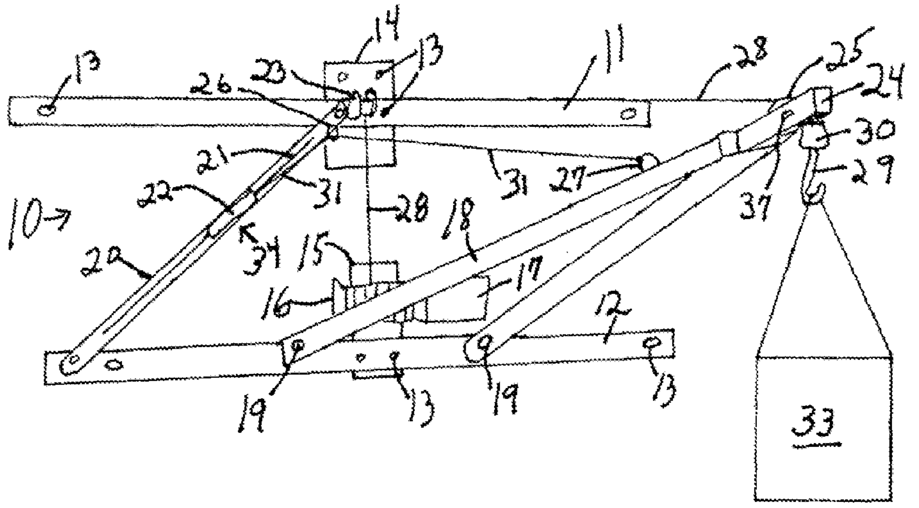
FIG. 3 shows a weight lifted by the winch up to the boom extension.
Figure 4:
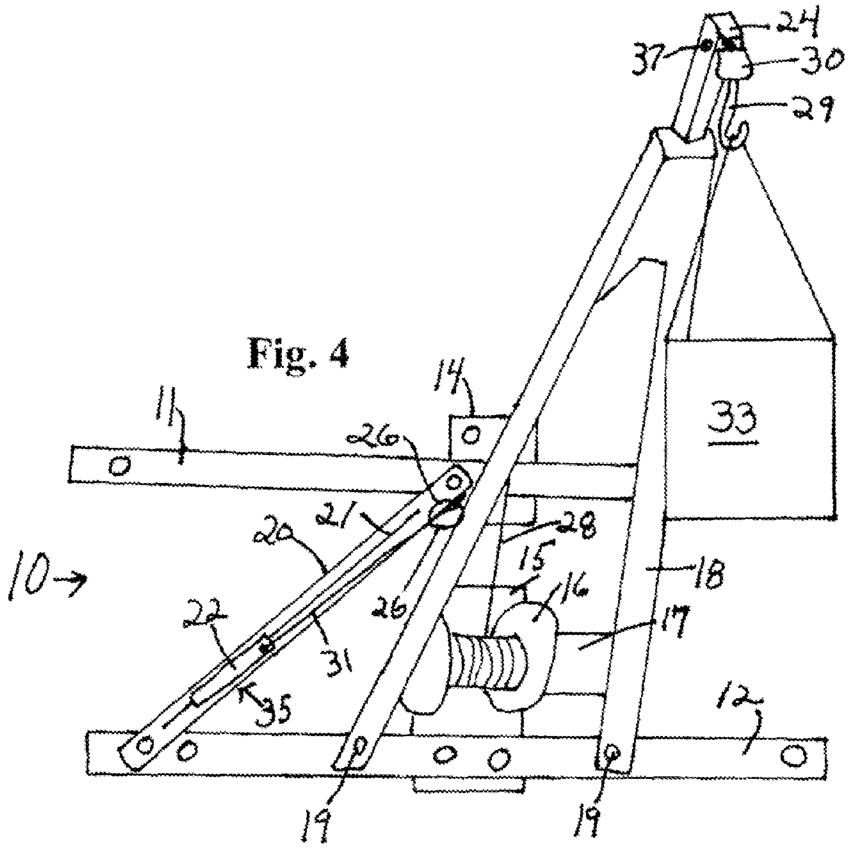
FIG. 4 shows the boom lifted by the winch to a relatively vertical position.

In FIG. 3 the weight 33 is shown lifted up to the boom extension 24. This is accomplished by turning on the winch motor 17 to wind up the winch cable 28 just sufficiently to bring the weight 33 up to the boom extension 24. In FIG. 4 the boom 18 is shown lifted to a relatively vertical position. This is accomplished by turning on the winch motor 17 to continue winding the winch cable 28 onto winch 16. As a consequence, the winch cable 28 pulls the boom 18 upwards since the base 30 of lift hook 29 cannot pass over sheave 25. The boom support cable 31 does not prevent the boom 18 from moving upwards. The boom support cable 31 only prevents the boom 18 from moving downwards from a selected position. When the boom 18 is elevated to the height shown in FIG. 4 the weight 33 will be above the loading bed or cargo receiving area of the vehicle and in the central area of the bed. As shown in FIG. 4, the grabbing mechanism 22 is moved down the adjustment bar 20 to position 3 at 35, and the boom support cable 31 will prevent the boom 18 from moving downward from its elevated, relatively vertical position.

When the winch motor 17 is turned on to unwind the winch cable 28 from winch 16 with the boom 18 in its elevated, fixed vertical position, the weight 33 will move downward as shown in FIG. 5. The boom 18 remains elevated because the grabbing mechanism 22 is still locked in place in position 3 at 35. The weight 33 engages the loading bed of the vehicle and can be disconnected from lift hook 29. If the vehicle bed is a dumping bed, the dumping bed can be rotated vertically to dump its load without being blocked by the boom 18 when the boom 18 is in this elevated, relatively vertical position. The boom 18 can then be lowered to the horizontal position by moving the grabbing mechanism 22 back to position 1 shown at 32.

Figure 7:
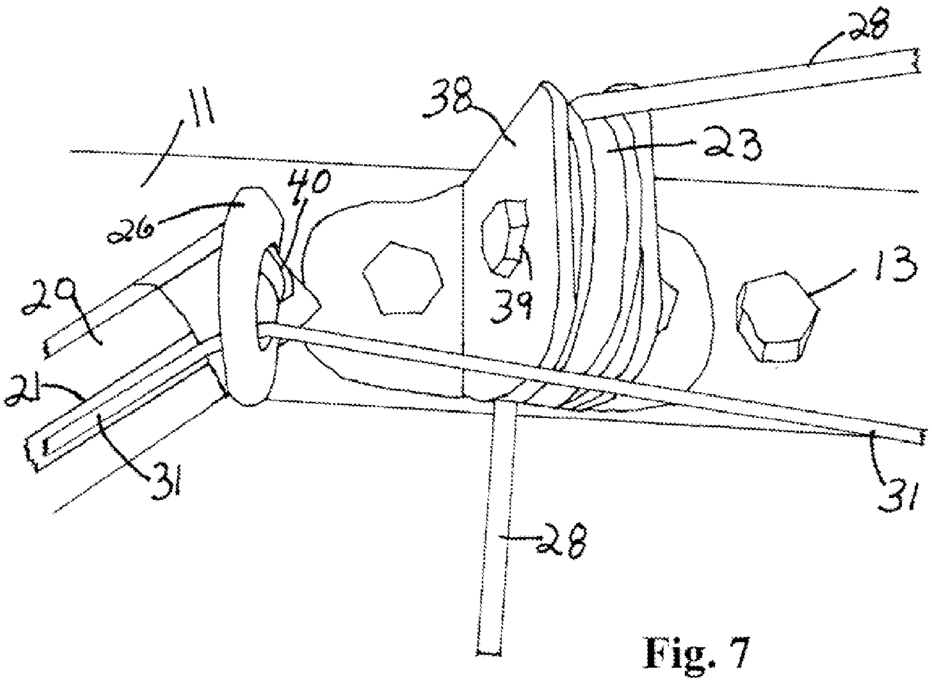
FIG. 7 shows a detailed view of the upper lift bar sheave and the adjustment bar for the boom support cable.
Figure 8:
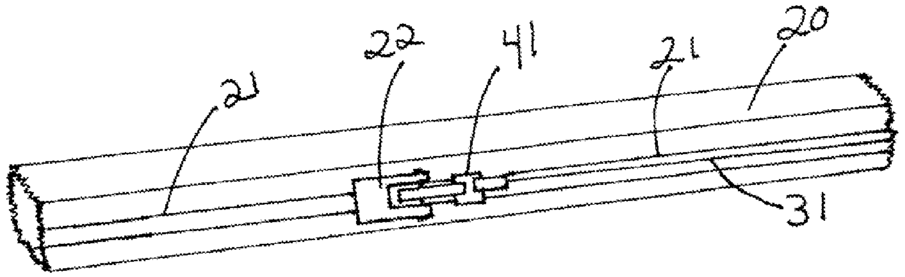
FIG. 8 shows a detailed view of the grabbing mechanism of the adjustment bar.

FIG. 6 shows a detailed view of the boom extension 24, further showing the sheave opening 36 and the sheave axle 37. FIG. 7 shows a detailed view of the upper lift bar sheave 23 and the eye hook 26, further showing a sheave bracket 38, a sheave axle 39, and an eye hook connector 40. The eye hook connector 40 attaches the eye hook 26 to the adjustment bar 20. The eye hook 26 guides the boom support cable 31 to the grabbing mechanism 22. FIG. 8 shows a detailed view of the grabbing mechanism 22, further showing linkage 41 to connect the boom support cable 31 to the grabbing mechanism 22.

The retrieval and hoist winch assembly can be made in any desirable size and dimension for dragging, retrieving, and hoisting any type of object. A vehicle having this winch assembly can drag big game up hills, through ditches, etc., and then the winch assembly can lift the animal up to and into the vehicle. The winch assembly can also be used in industrial settings and farm settings to move parts, material, feed sacks, tree stands, and the like.

Figure 9:
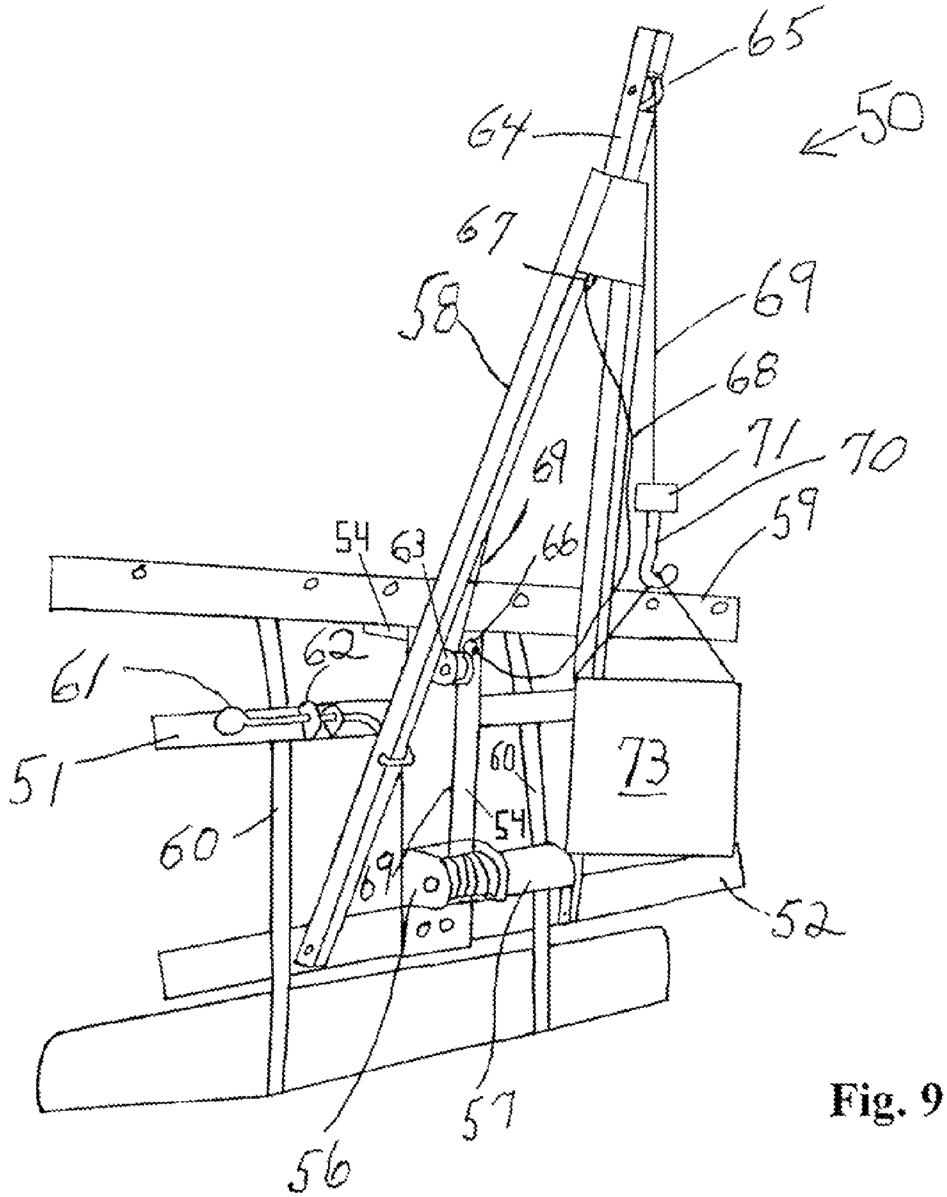
FIG. 9 shows an alternate embodiment of the winch assembly.

FIG. 9 shows an alternate embodiment 50 of winch assembly 10. Winch assembly 50 has a boom 58, an upper horizontal support plate 51, and lower horizontal support plate 52, and a top horizontal canopy post 59. The components 51 and 52 may be attached to support bars 60, collectively referred to as a support system, which may be attached to the back of a cab or roll bar enclosure of a vehicle (not shown). A vertical support plate 54, preferably, a 90 degree L-shaped support plate, is attached to horizontal support plates 51 and 52 and to the rear horizontal canopy post 59, preferably, with 2 U-bolts (not shown). The boom 58 is attached rotatably at a first end to the lower support plate 52 so that the boom 58 may rotate vertically up or down. A winch 56 with its motor 57 is attached to the vertical support plate 54. A first cable sheave 63 is attached to an upper portion of support plate 54 above the winch 56. The boom 58 has a boom extension 64 at a second opposite end of the boom 58 with a second cable sheave 65. (The boom extension 64 may have a plurality of cable sheaves instead of a single sheave 65). A winch cable 69 extends from winch 56 over the first cable sheave 63 and to the second cable sheave 65 (or between a pair of cable sheaves in the boom extension 64). The free end of winch cable 69 has a base 71 with a lift hook 70.

A boom support cable 68 is connected at its first end to the support 54, above winch 56, by means of a cable connector 66. A second opposite end of boom support cable 68 is connected to the boom 58 near the second opposite end of boom 58, or to the boom extension 64, by means of cable connector 67. The boom support cable 68 prevents the boom 58 from being lowered below a desired level. A boom hook 61 is attached rotatably and slidably to the horizontal support plate 51 by means of boom hook holder 62. The boom hook 61 can be rotated vertically up and down and can be moved back and forth horizontally. Boom 58 is shown in an elevated vertical position and held in that position by the boom hook 61 as boom hook 61 is made to engage one of the two legs of boom 58. In this configuration the load 73 attached to hook 70 may be raised and lowered by winch 56 over a cargo area of a vehicle (not shown) while boom 58 remains in a fixed position. A boom hook 61 may also be used in a similar manner on the second leg of boom 58.

The foregoing description has been limited to specific embodiments of this invention. It will be apparent, however, that variations and modifications may be made, by those skilled in the art, to the disclosed embodiments of the invention, with the attainment of some or all of its advantages and without departing from the spirit and scope of the present invention. For example, any suitable type of boom may be used, including one with a single leg. Any type of pulley can be used as a cable sheave. The hoist winch assembly can be used with any type of vehicle having a cargo receiving area or dumping bed. Any suitable type of support system for attachment to a vehicle can be utilized. The support system may be used without a vertical support plate. Any type of suitable winch may be used. The components of the hoist assembly described above may be used for a kit containing these components, further including instructions for attaching the components to a support system of a vehicle.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A hoist assembly for attachment to a vehicle having a cargo area with a front end and an opposing back end, said hoist assembly comprising:

a) a support member for immovable attachment to a cab or roll bar of the vehicle adjacent the front end of the cargo area;

b) a winch attached to said support member;

c) a first cable sheave attached to said support member superjacent said winch;

d) a boom having a first end and an opposing second end, wherein said first end of said boom is rotatably attached to said support member, wherein said second end of said boom is movable between a raised position and a lowered position, wherein said second end of said boom is above the cargo area when said boom is in said raised position and said second end of said boom extends beyond the back end of the cargo area when said boom is in said lowered position;

e) a second cable sheave attached to said second end of said boom;

f) a winch cable having a first end attached to said winch and an opposing second end, wherein said winch cable extends from said winch substantially vertically to said first cable sheave and from said first cable sheave to said second cable sheave;

g) a lift member attached to said second end of said winch cable subjacent said second cable sheave for securing a load; and h) a locking member attached to said support member for securing said boom in said raised position;

i) said lift member is operable to attach to the load when said boom is in said lowered position, said winch is operable to wind said winch cable until said lift member engages said second sheave, said winch is operable to further wind said winch cable after said lift member engages said second sheave and thereby rotate said second end of said boom from said lowered position to said raised position, said locking member is operable to reversibly secure said boom in said raised position, said winch is operable to unwind said winch cable when said boom is secured in said raised position such that said lift member disengages from said second sheave and lowers the load into the cargo area.

2. The hoist assembly according to claim 1, wherein said locking member is a slidable boom hook operable to slidably engage said boom when said boom is in said raised position and thereby secure said boom in said raised position while said winch raises or lowers the load by means of said winch cable.

3. The hoist assembly according to claim 1, further comprising a boom support cable to prevent said boom from rotating downwards below a predetermined position, wherein a first end of said boom support cable is connected to said support member and a second opposing end of said boom support cable is connected to said boom in proximity to said second end of said boom.

4. A hoist assembly for attachment to a vehicle having a cargo area with a front end and an opposing back end, said hoist assembly comprising:

a) a support member for immovable attachment to a cab or roll bar of the vehicle adjacent the front end of the cargo area, wherein said support member comprises an upper horizontal support member for attachment to the cab or roll bar, a lower horizontal support member for attachment to the cab or roll bar, and a vertical support member attached to said upper horizontal support member and said lower horizontal support member;

b) a winch attached to said vertical support member;

c) a first cable sheave attached to said vertical support member superjacent said winch;

d) a boom having a first end and an opposing second end, wherein said first end of said boom is rotatably attached to said lower horizontal support member, wherein said second end of said boom is movable between a raised position and a lowered position, wherein said second end of said boom is above the cargo area when said boom is in said raised position and said second end of said boom extends beyond the back end of the cargo area when said boom is in said lowered position;

e) a second cable sheave attached to said second end of said boom;

f) a winch cable having a first end attached to said winch and an opposing second end, wherein said winch cable extends from said winch substantially vertically to said first cable sheave and from said first cable sheave to said second cable sheave;

g) a lift member attached to said second end of said winch cable subjacent said second cable sheave for securing a load; and h) a locking member attached to said upper horizontal support member for securing said boom in said raised position;

i) said lift member is operable to attach to the load when said boom is in said lowered position, said winch is operable to wind said winch cable until said lift member engages said second sheave, said winch is operable to further wind said winch cable after said lift member engages said second sheave and thereby rotate said second end of said boom from said lowered position to said raised position, said locking member is operable to reversibly secure said boom in said raised position, said winch is operable to unwind said winch cable when said boom is secured in said raised position such that said lift member disengages from said second sheave and lowers the load into the cargo area.

5. The hoist assembly according to claim 4, wherein said locking member is a slidable boom hook operable to slidably engage said boom when said boom is in said raised position and thereby secure said boom in said raised position while said winch raises or lowers the load by means of said winch cable.

6. The hoist assembly according to claim 4, further comprising a boom support cable to prevent said boom from rotating downwards below a predetermined position, wherein a first end of said boom support cable is connected to said vertical support member and a second opposing end of said boom support cable is connected to said boom in proximity to said second end of said boom.

* * * * *